E. A. Sterry,
Globe Valve,
Nº 13,047.  Patented June 12, 1855.
Fig: 1
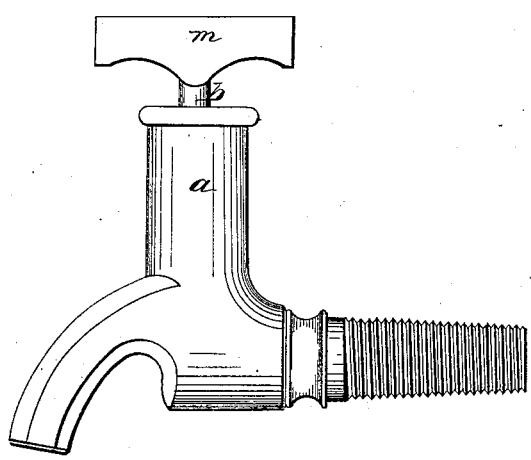
Fig: 3
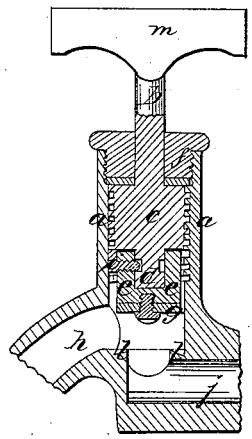
Fig: 2
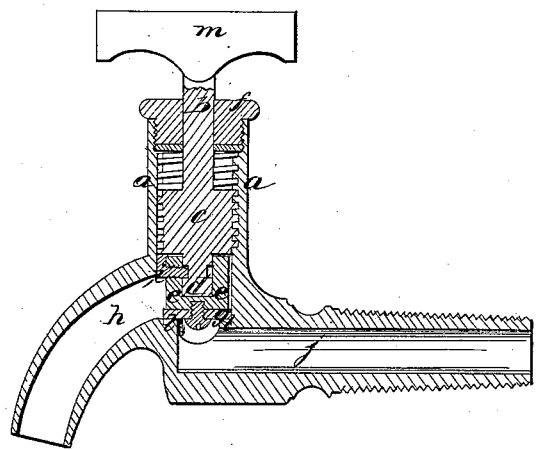
Fig: 4
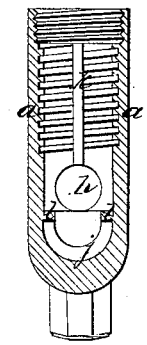

UNITED STATES PATENT OFFICE.

EDWARD A. STERRY, OF NORWICH, CONNECTICUT.

FAUCET.

Specification forming part of Letters Patent No. 13,047, dated June 12, 1855; Reissued June 7, 1870, No. 4,022.

*To all whom it may concern:*

Be it known that I, EDWARD A. STERRY, of Norwich town, in the county of New London and State of Connecticut, have invented a new and useful Improvement in Stop-Cocks; and I do hereby declare that the following is a full and exact description thereof, reference being had to the accompanying drawings, making a part of this specification, in which—

Figure 1 is a side view of my improved stop cock; Fig. 2, a vertical longitudinal section thereof, representing the valve in a closed position; Fig. 3, a section representing the valve in an open position, and Fig. 4, a transverse section with the valve removed.

Similar letters indicate like parts in all the figures.

The first feature of my invention consists in so shaping and arranging the respective parts of a stop cock, that the valve will rise and fall vertically from and to its seat, and thereby prevent the grinding friction caused by the turning of the valve within its chamber and upon its seat.

The second feature of my invention, consists in so arranging and proportioning the respective parts of my improved stop cock that the valve cannot be opened or closed suddenly; by which the bursting of water pipes from the reaction caused by the instantaneous closing of the valve of the cock, will be prevented.

A valve seat $l$, surrounds the aperture which connects the interior $j$, of the barrel of the cock to the interior $h$, of the nozzle of the same. The key of the cock, is composed of the handle $m$, the spindle $b$, the enlargement $c$, and the shank $d$, as represented in Fig. 2. The valve $e$, is connected to the shank $d$, by means of a socket in the valve that receives said shank and the screw $i$, which passes through the side of the valve and into an annular groove in the side of the said shank, by which the key can be turned without turning the valve, but cannot be elevated or depressed without moving the valve with it. The head of the screw $i$, fits into and works freely in the groove $k$, in the side of the vertical chamber $a$, of the cock, and thereby prevents the valve from being turned around as it is elevated and depressed. A screw thread is formed on the periphery of the enlargement $c$, of the key, which fits into a female screw in the inner periphery of the vertical chamber $a$, the said male and female screws being of such an inclination that the valve cannot be opened or closed without giving the key two, three, or more entire revolutions, which arrangement, insures the gradual closing of the valve of the cock and the stoppage of the water, and will prevent the bursting of water pipes by the reaction of the water (caused by sudden stoppage) in situations where there is a very great pressure. The spindle $b$, of the cock passes through and is guided by the head $f$, which is screwed into the top of the chamber $a$.

I am aware that valves have been made to rise and fall vertically without being turned upon their axes, and therefore I do not claim this as my invention, but What I do claim and desire to secure by Letters Patent is—

The arrangement of the valve $e$, the set screw $i$, the grooved shank $d$, and the screw enlargement $c$, of the spindle of the key, with each other and with the female screw in the sides of the chamber $a$, and the groove $k$, which cuts through the threads of said screw, by which, in a cock of the usual proportions, the valve can be moved up and down without being turned on its axis, substantially as herein set forth.

The above specification of my improvement in faucets or stop cocks signed and witnessed this 29th day of March 1855.

EDW. A. STERRY.

Witnesses:
Z. C. ROBBINS,
GEORGE W. ADAMS.

[FIRST PRINTED 1912.]